United States Patent
Green et al.

(10) Patent No.: US 7,884,830 B1
(45) Date of Patent: Feb. 8, 2011

(54) APPARATUS, SYSTEM, AND METHOD FOR INDEXING AN ARRAY OF CUBE MAP TEXTURES

(75) Inventors: Simon G. Green, London (GB); Mark J. Harris, London (GB); Oliver Strunk, Munich (DE)

(73) Assignee: Nvidia Corporation, Santa Clara, CA (US)

( * ) Notice: Subject to any disclaimer, the term of this patent is extended or adjusted under 35 U.S.C. 154(b) by 825 days.

(21) Appl. No.: 11/486,181

(22) Filed: Jul. 12, 2006

(51) Int. Cl.
G06T 11/40 (2006.01)
G09G 5/00 (2006.01)

(52) U.S. Cl. .................. 345/582; 345/552; 345/587; 345/623

(58) Field of Classification Search ............. 345/552, 345/582, 587, 424, 426, 427, 623
See application file for complete search history.

(56) References Cited

U.S. PATENT DOCUMENTS

| 6,664,963 | B1 * | 12/2003 | Zatz ..................... 345/426 |
| 6,828,980 | B1 * | 12/2004 | Moreton et al. ............. 345/582 |
| 6,876,362 | B1 * | 4/2005 | Newhall et al. ............. 345/426 |
| 6,940,512 | B2 * | 9/2005 | Yamaguchi et al. ......... 345/505 |
| 7,109,999 | B1 * | 9/2006 | Lindholm et al. ........... 345/582 |
| 7,154,507 | B1 * | 12/2006 | Moreton et al. ............. 345/582 |
| 2004/0054869 | A1 * | 3/2004 | Igarashi .................... 712/11 |
| 2005/0237337 | A1 * | 10/2005 | Leather et al. ............. 345/582 |
| 2006/0053189 | A1 * | 3/2006 | Mantor .................... 708/490 |
| 2007/0052724 | A1 * | 3/2007 | Graham et al. ............. 345/620 |
| 2008/0106549 | A1 * | 5/2008 | Newhall et al. ............. 345/426 |

OTHER PUBLICATIONS

McAllister et al., Efficient Rendering of Spatial Bi-directional Reflectance Distribution Functions, 2002, The Eurographics Association, pp. 79-86.*
NVIDIA Corporation, "SDK White Paper—Improve Batching Using Texture Atlases", Jul. 2004, Santa Clara, CA 17 pgs.
NVIDIA Corporation, "White Paper—Shader Model 3.0 Using Vertex Textures", Jun. 24, 2004, Santa Clara, CA 14 pgs.

* cited by examiner

Primary Examiner—Hau H Nguyen
(74) Attorney, Agent, or Firm—Cooley LLP (57) ABSTRACT

A graphics system supports arrays of cube map textures. In one implementation, a cube map texture is utilized as an index into a set of cube map textures. The set of cube map textures may further be arranged into an atlas of two-dimensional textures.

14 Claims, 6 Drawing Sheets

APPARATUS, SYSTEM, AND METHOD FOR INDEXING AN ARRAY OF CUBE MAP TEXTURES

FIELD OF THE INVENTION

The present invention is generally directed towards the use of cube map textures to store directional data. More particularly, the present invention is directed towards the utilization of arrays of cube map textures.

BACKGROUND OF THE INVENTION

Figure 1:
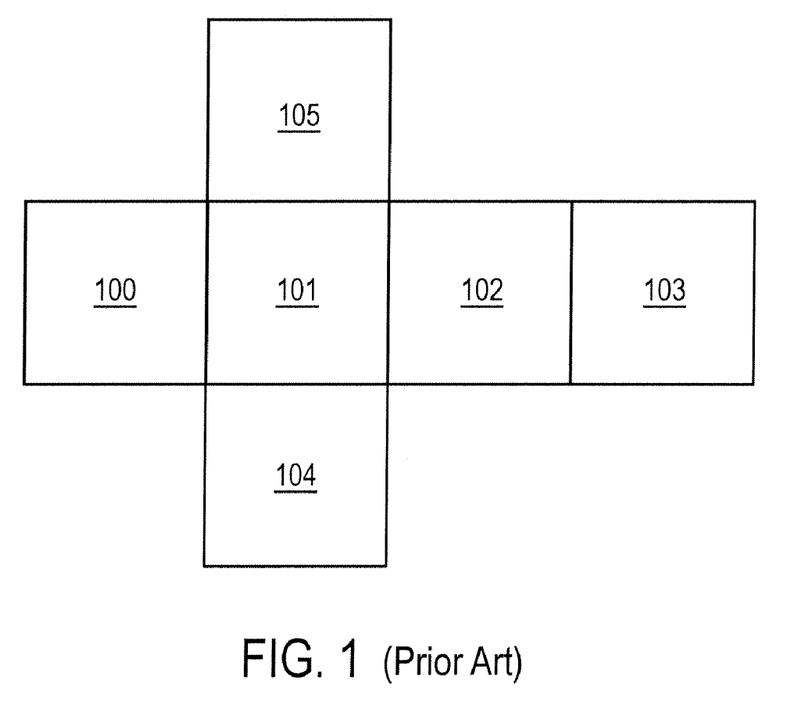
FIG. 1 illustrates the faces of a cube map texture in accordance with the prior art.

Cube map texturing is a form of texture mapping for graphics processing that utilizes a three-dimensional directional vector as an index into a texture that is a six-faced cube. As illustrated in FIG. 1, the six faces 100, 101, 102, 103, 104, and 105 of the cube are stored as a set of six two-dimensional textures. Cube map texturing is, for example, described in the OpenGL® Graphics System Specification Version 2.0, Appendix F, the contents of which are hereby incorporated by reference.

Figure 2:
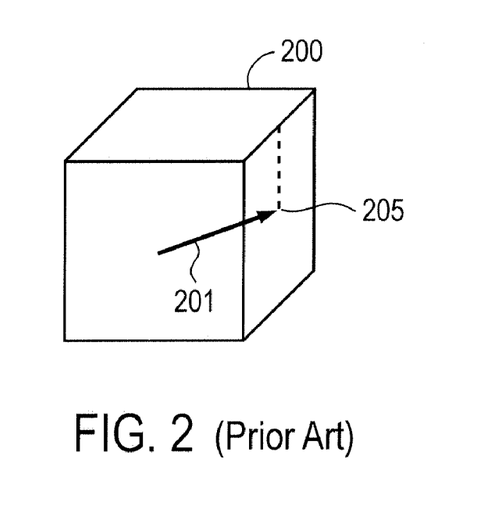
FIG. 2 illustrates a directional vector indexing a cube map texture.

Referring to FIG. 2, in the OpenGL® implementation of cube map texturing a three-dimensional direction vector 201 emanating from the center of a cube 200 is used to select one of the cube map faces. The intersection point 205 of three-dimensional vector 201 with cube 200 is used to identify a cube face. Additionally, the intersection point 205 is used to identify texture coordinates on the cube face to fetch a texture value.

Cube map textures are useful for storing directional data because of the nature in which the cube map is indexed by a directional vector 201. As one example, bi-directional reflectance distribution function (BRDF) data is often stored in cube maps so that the view and light directions can be used to index the function using a simple texture lookup.

One limitation of conventional cube map texturing is that the current generation of graphics processing hardware and application programming interfaces (APIs) does not support arrays of cube map textures. For example, the DirectX 10.0 API does not support arrays of cube map textures. As a consequence, conventional cube map texturing cannot be directly used to access different instances of cube map textures. One consequence of this limitation is that conventional cube map texturing techniques do not directly support utilizing cube map texturing to provide directional data with different attributes for a collection of different objects rendered at the same time.

In light of the above-described problems the apparatus, system, and method of the present invention was developed.

SUMMARY OF THE INVENTION

A graphics system stores an array of cube map textures. The array of cube map textures corresponds to a set of cube map textures have different instances of cube map textures. An index is formed into the array of cube map textures. The index permits a graphics processor to access a selected cube map texture based on a vector input an instance index of cube map textures. In one implementation, the index includes a cube map texture in which face address information and position offset information are mapped onto the cube map texture to form an address cube map for accessing the array of cube map textures.

In one embodiment, a graphics processor is configured to determine a texture value from a set of cube map textures. The graphics processor selects texture coordinate values based on an input three-dimensional vector and an instance index identifying a selected cube map texture, the set of cube map textures including at least two different cube map textures with each cube map texture having six faces. In one implementation the set of cube map textures is indexed by another cube map texture utilized as an address cube map.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 3:
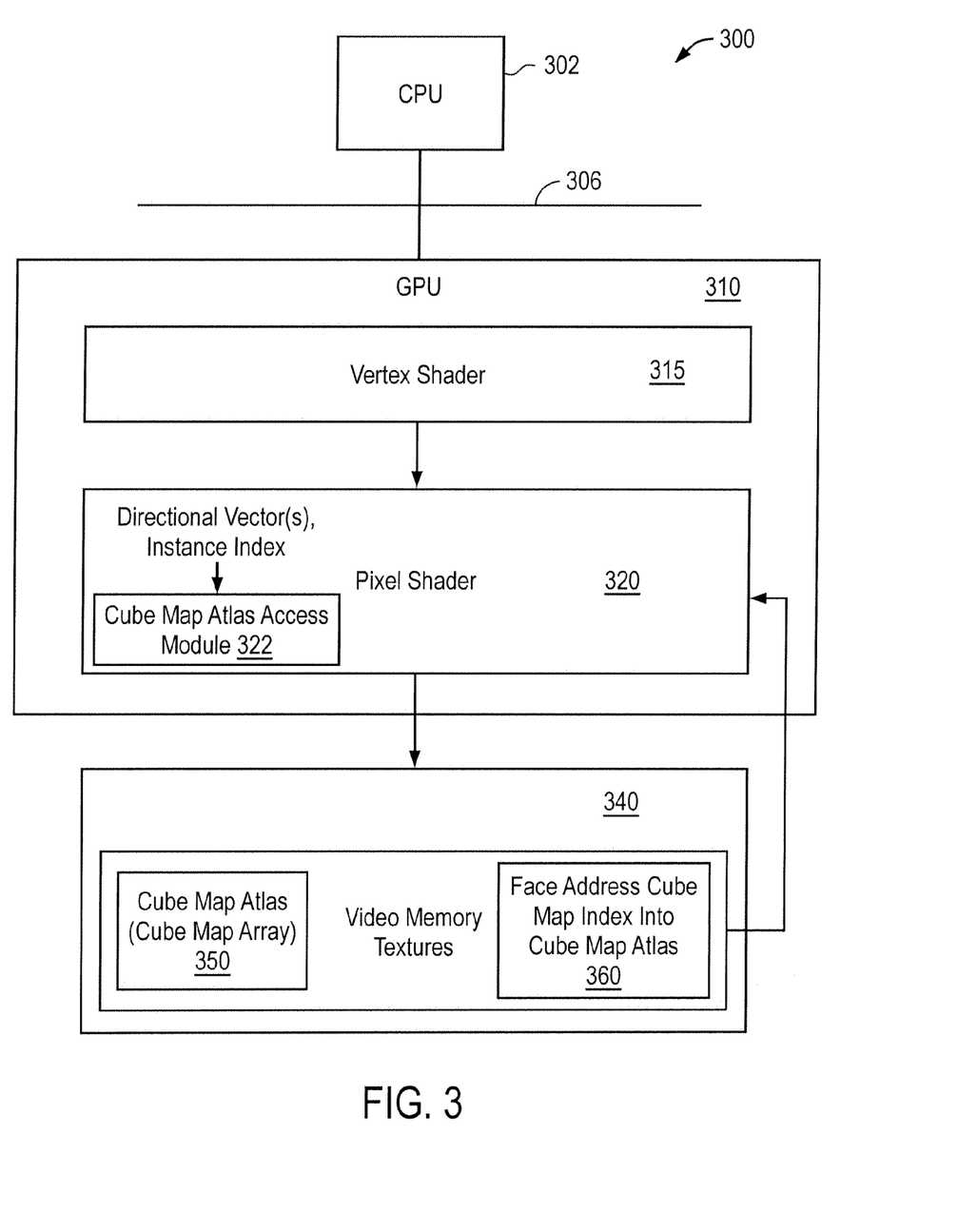
FIG. 3 illustrates a graphics system in accordance with one embodiment of the present invention.

FIG. 3 illustrates a graphics processing system 300 in accordance with one embodiment of the present invention. A central processing unit (CPU) 302 is communicatively coupled to a graphics processing unit (GPU) 310 by an interface 306. GPU 310 has a graphics pipeline including a vertex shader 315 and a pixel shader 320. In one embodiment GPU 310 is programmable.

A graphics memory 340, such as a video RAM memory, stores a cube map atlas 350 containing texture data for a set of cube map textures. The set of cube map textures is stored as sub-textures within a two-dimensional texture. That is, cube map atlas 350 stores texture information corresponding to an array of cube map textures. Graphics memory 340 also includes a face address cube map index 360, which is described below in more detail, to obtain address information and perform a mapping into texture values within cube map atlas 350.

Pixel shader 320 includes a cube map atlas access module 322 to access cube map textures within cube map atlas 350 based on directional vectors and instance index information specifying an instance of a cube map texture. The directional vectors and instance index information may be received by pixel shader 320 from other components.

Figure 4:
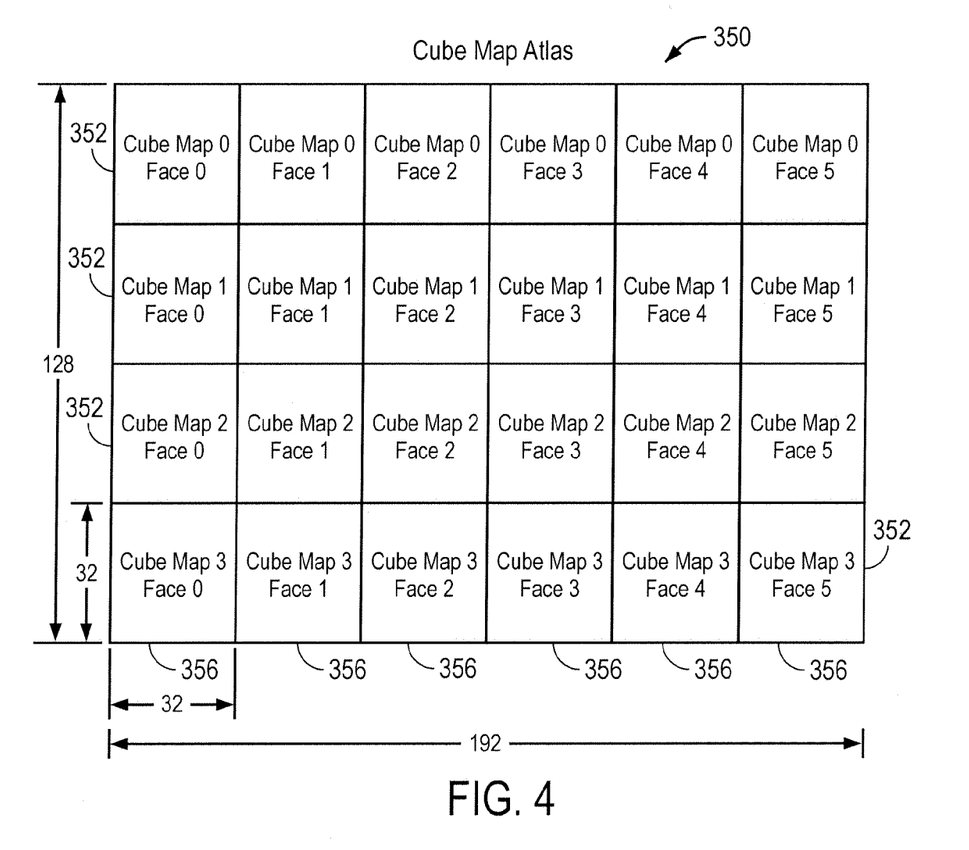
FIG. 4 illustrates a cube map atlas in accordance with one embodiment of the present invention.

FIG. 4 illustrates an exemplary cube map atlas 350 in more detail. Cube map atlas 350 contains the texture information of an array of cube map textures having a positive integer number, N, instances of cube map textures. Each individual cube map face preferably has the same resolution to facilitate indexing. In the illustrated example, each face of a cube contains 32-bit floating point RGB texels.

Cube map atlas 350 is organized as a two-dimensional texture map in which each individual cube map texture ("cube map") is organized as sub-textures within the larger two-dimensional texture map. To facilitate indexing, the different cube map textures ("cube maps") are preferably arranged in rows 352 and the faces arranged in columns 356. The cube map atlas thus has a cumulative height and width. The total width of the cube map atlas is 6*face_width and the total height is N*face_height, where N is the number of different instances of cube map textures supported, face_width is the width of the cube face (e.g., 32), face_height is the height of the cube face (e.g., 32), and * is a multiplication operation. For example, an atlas of four cube map textures each with 32×32 faces is stored in a 192×128 two-dimensional texture map.

Since the cube map atlas 350 is arranged as a two-dimensional texture map the coordinates within a particular cube map may be referenced by (x, y) coordinates of the two-dimensional texture map. However, note that cube map atlas 350 has faces with common face numbers aligned in columns and common cube map instance numbers aligned in rows. Consequently, texture coordinates may also be referenced by face number, instance number, and an (x, y) coordinate offset. For example, the texture coordinate in the x direction ("textcoord x") may be calculated as the distance corresponding to the total number of whole faces traversed in the x direction from an origin plus an x offset in the destination face, i.e., textcoord x=f*face_width+x_offset, where f is a face index (e.g., 0 1, 2, 3, 4, 5 for face faces 0, 1, 2, 3, 4, and 5), face width is the width of a face (e.g., 32 units), and x_offset is an offset within one face. Similarly, the texture coordinates in the y direction ("text coord y") may be calculated as the distance corresponding to the total number of whole faces traversed from an origin plus a y offset, i.e., text coord y=index*face_height+y_offset, where index is a cube map instance index, face_height is the face height, and y_offset is the y offset.

Figure 5:
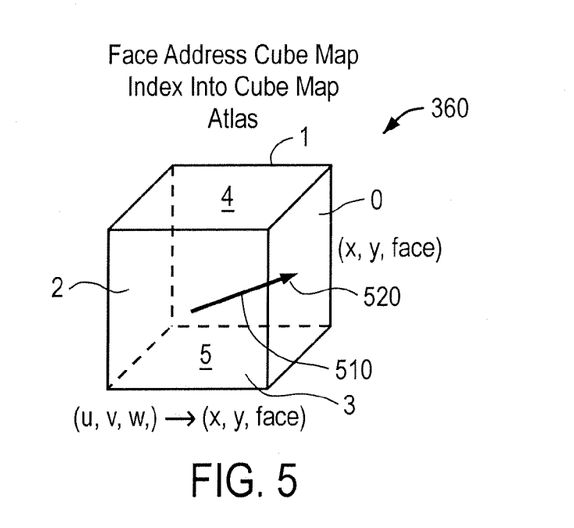
FIG. 5 illustrates a face address cube map in accordance with one embodiment of the present invention.

FIG. 5 illustrates an exemplary face address cube map index 360. Face address cube map index 360 is a cube map texture in which the faces of the cube map texture are used to store address index information to access cube map atlas 350. In a face address cube map fetch, an input three-dimensional coordinate vector 510 (e.g., a (u, v, w) directional vector) is centered at the cube center. Directional vector 510 will intersect one of the faces 0, 1, 2, 3, 4, or 5 of face address cube map index 360. Additionally, the intersection point on a face has a coordinate offset (i.e., x, y offsets if x, y coordinates are used) with respect to the center of the face. An additional mapping step may be performed using the results of a face address cube map fetch to obtain the final texture coordinate values within cube map atlas 350 used to access the final texture value.

In one embodiment the faces of the face address cube map 360 contain 32-bit floating point red-green-blue (RGB) texels. The value of each texel is (s, t, f), where s and t are the (s, t)-coordinates (horizontal, vertical) of the corresponding pixel in the cube map atlas 350, and f is the face index. So, for example, the value of the texel at coordinates (x, y) in face 3 of a cube map with 32×32 faces will be (3*32+x, y)=(96+x, y). Thus, the cube map texels satisfy the formula: (r, g, b)= (f*face width+s, t, f), where f is the face index, (s, t, f) is the value of the texel. In one embodiment the vertical coordinate is unmodified. This is so that the same face address cube map can be used for all cube maps stored in the atlas. The coordinates returned from a face address cube map lookup need only have n*face height added to the t-coordinate, where n is a positive integer depending on the instance number. Note that the value off is not necessary to store in the B value of each texel, but it can be useful in some computations to know which face the value came from.

Face address cube map index 360 permits a cube map texture operation to be used to identify the column number (face number) and position within a face in the cube map atlas based on an input directional vector. Additional information on the instance number (row number) may then be used to identify unique texture coordinates within one cube map texture. As an illustrative example, referring again to FIG. 5, directional vector 510 intersects face 0. This limits a search in the cube map atlas to the column for face 0. If the graphics hardware does not support texture interpolation the face address cube map must have the same resolution as the faces of the cube map atlas, since this permits a direct mapping between the (x,y) offset indicated by intersection point 520 and the texture coordinates on an individual face of the cube map atlas. On graphics hardware which supports texture interpolation, this direct mapping is unnecessary; instead the resolution of the face address cube map can be reduced, and the missing values can be computed via texture interpolation.

Figure 6:
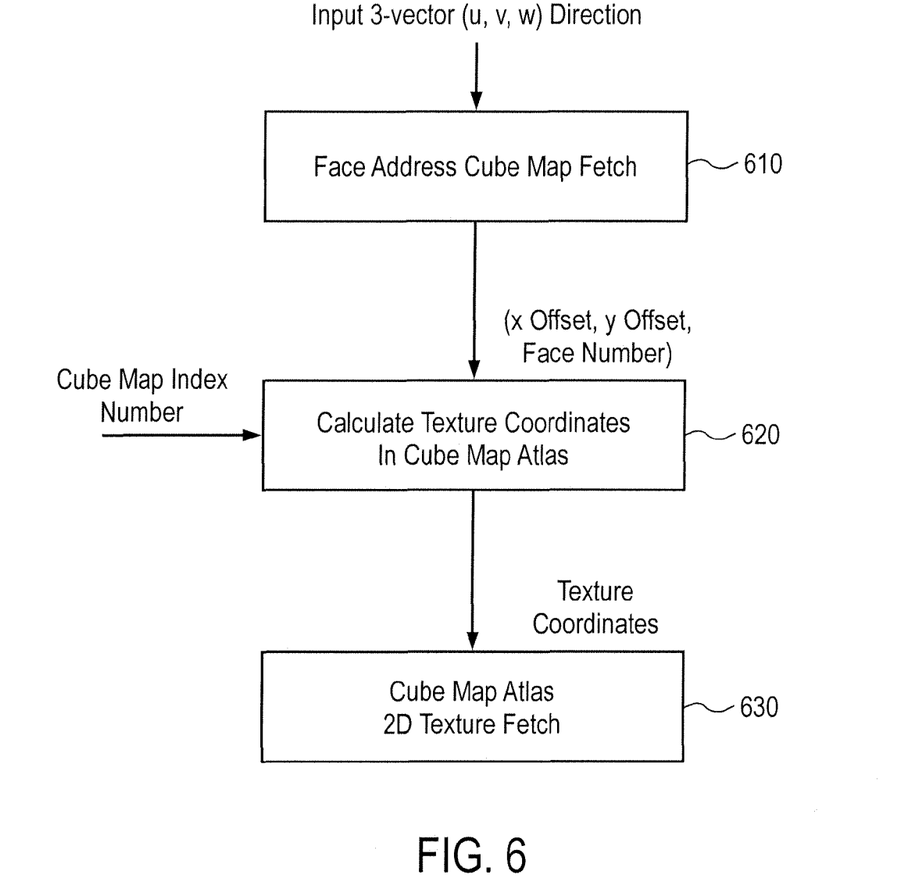
FIG. 6 illustrates a flow chart of a method of accessing information from an array of cube map textures using a face address cube map in accordance with one embodiment of the present invention.

FIG. 6 is a flow chart illustrating an exemplary process for a pixel shader to utilize the cube map atlas 350. An input three-dimensional directional vector (a "3-vector") is selected as an input for a texture fetch from the cube map atlas. A face address cube map fetch is performed 610 to access the face address cube map 360. The result of the face address cube map fetch is a face number, x coordinate offset, and y coordinate offset. These results are used in combination with a cube map index number to calculate 620 texture coordinates in the cube map atlas. A texture fetch 630 is then performed to access a two-dimensional texture based on the calculated texture coordinates.

Exemplary Cg fragment program code for using the cube map atlas and face address cube map is as follows:

float4 example(uniform sampler2D cubeMapAtlas,
    uniform sampler2D addressCubeMap,
    uniform float cubeMapindex
    uniform float cubeMapHeight,
    float dir:TEXCOORD0):COLOR0
    {
    float2 address=texture2D(addressCubeMap, dir);
    address.y+=cubeMapHeight*cubeMapindex;
    return texture2D(cubeMapAtlas, address);
    } where dir corresponds to a directional vector, the addresses are floating point addresses, and the code performs a sequence of steps similar to that illustrated in FIG. 6 to use a face address cube map "addresscubemap" and direction vector "dir" as an index into the cube map atlas.

One benefit of the present invention is that it permits a common pixel shader to access an array of cube map textures storing different instances of directional data. This permits, for example, a common pixel shader to calculate directional data for different instances, such as different instances of objects or materials. For example, a set of cube map textures may be pre-computed by a CPU or GPU and stored in video RAM. The set of cube map textures includes one cube map texture for each object or material for which directional data of a selected type might need to be computed. A corresponding face address cube map would also be pre-computed and stored in the graphics memory. Since conventional graphics hardware and APIs do not presently support arrays of cube map textures, the present invention permits arrays of cube map textures to be utilized in new applications.

One application of the present invention is to store bi-directional reflectance distribution function (BRDF) data for two or more different materials. In this example, each material has its own cube map texture within the cube map atlas to store BRDF data. A material index could be used to look up reflectance data for different materials.

Figure 7:
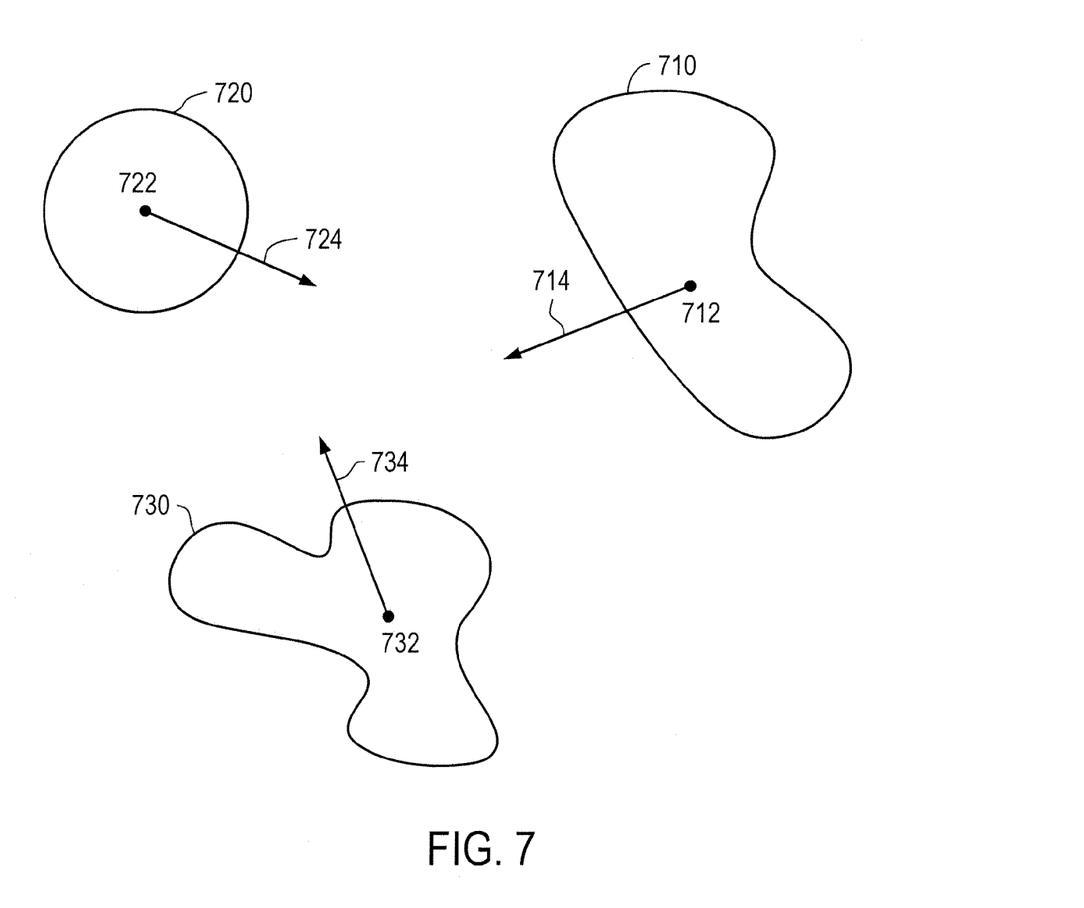
FIG. 7 illustrates an exemplary rigid body collision geometry.

Another application of the present invention is to store height information for use in rigid body simulations. Rigid body simulations are a class of simulations in which rigid objects obey Newtonian mechanics that govern how the particles move and collide. As illustrated in FIG. 7, rigid bodies 710, 720, and 730 may comprise three dimensional objects having arbitrary shapes. Each rigid body has its own centroid 712, 722, and 732 and directional vector 714, 724, and 734.

Figure 8:
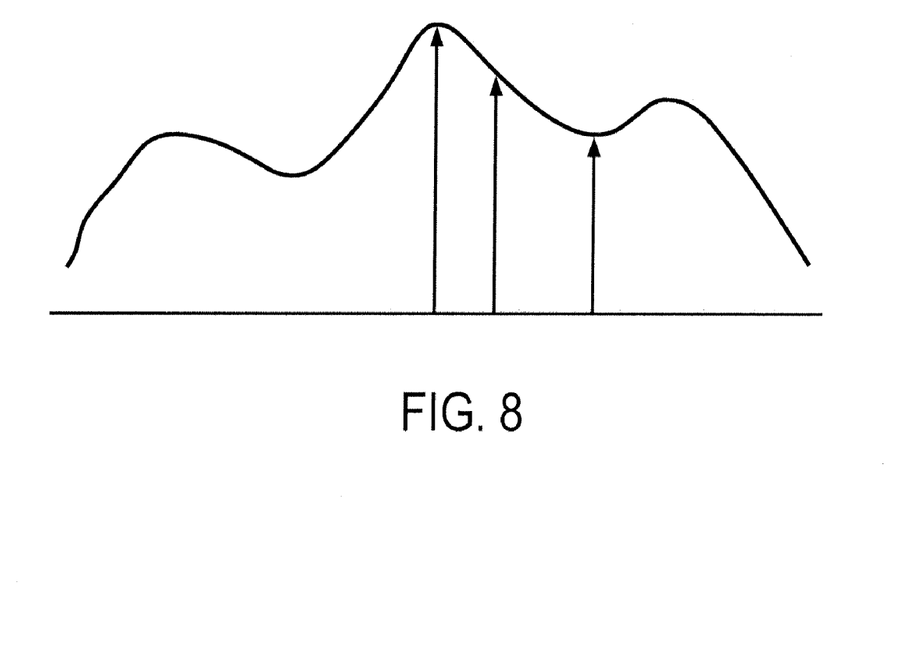
FIG. 8 illustrates a height map.

As illustrated in FIG. 8, the height of an object may be mapped and stored as a height. In particular, a three dimensional object may be described along a directional vector from its centroid by a height.

Figure 9:
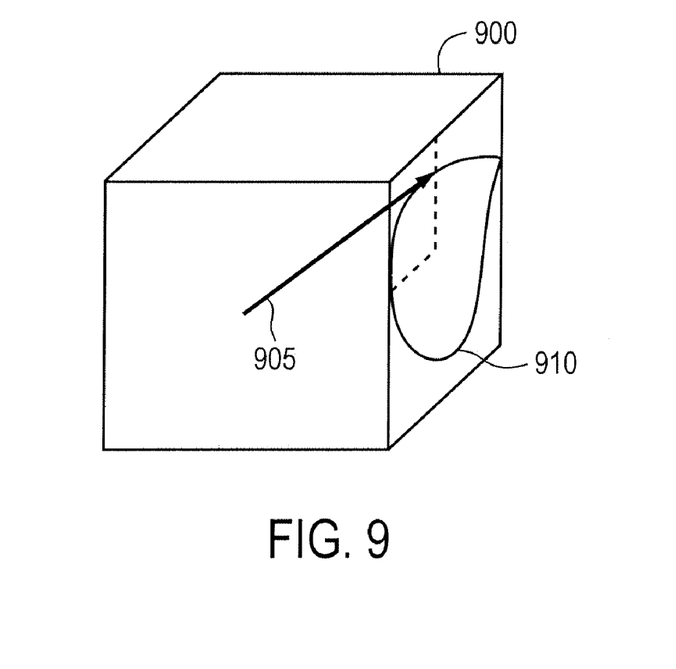
FIG. 9 illustrates a cube map texture utilized to record a height map for use in collision detection in accordance with one embodiment of the present invention.

As illustrated in FIG. 9, in one embodiment an individual cube map texture 900 stores a height map 910 providing topographical information on how the height of the object (i.e., distance from a centroid) varies and which may, for example, identify regions of constant height in analogy to a contour map. The height of the object along a particular direction may then be checked by examining the height stored in the height map at a selected input directional vector 905. Note that since the present invention supports arrays of cube maps that height maps for objects having different shapes may be supported. Consequently, in a rigid body simulation each object may have its own height map stored as one row of a cube map atlas. Height information may then be accessed for each object by selecting a directional vector and instance number (i.e., object number) and applying the previously described indexing techniques to access height information for the selected object along a selected direction.

As illustrated in FIG. 9, in one embodiment an individual cube map texture 900 stores a height map 910 providing topographical information on how the height of the object (i.e., distance from a centroid) varies and which may, for example, identify regions of constant height in analogy to a contour map. The height of the object along a particular direction may then be checked by examining the height stored in the height map at a selected input directional vector 905. Note that since the present invention supports arrays of cube maps, that height maps for objects having different shapes may be supported. Consequently, in a rigid body simulation each object may have its own height map stored as one row or a cube map atlas. Height information may then be accessed for each object by selecting a directional vector and instance number (i.e., object number) and applying the previously described indexing techniques to access height information for the selected object along a selected direction.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A graphics apparatus operative to process different cube map textures, comprising:
   a graphics processor configured to determine a texture value from an array of cube map textures including at least two different cube map textures with each cube map texture having six faces, said graphics processor utilizing another cube map texture as an address map in which said graphics processor utilizes an intersection of a three-dimensional vector with a face of said another cube map texture to identify texture coordinates within said array of cube map textures, said array of cube map textures storing different instances of directional data.

2. The graphics apparatus of claim 1, wherein said array of cube map textures is indexed as a two-dimensional texture atlas and said graphics processor determines texture coordinates on said two-dimensional texture atlas by accessing said another cube map texture to fetch address information to determine texture coordinates within said two-dimensional texture atlas.

3. The graphics apparatus of claim 2, wherein said address information specifies one of said six faces and a texture coordinate offset.

4. The graphics apparatus of claim 1, wherein a pixel shader determines said texture value.

5. The graphics apparatus of claim 1, wherein said array of cube map textures is indexed as an atlas of two-dimensional textures.

6. The graphics apparatus of claim 1, wherein said array of cube map textures is pre-computed to store directional data for a plurality of objects.

7. The graphics apparatus of claim 1, wherein said array of cube map textures is pre-computed to store directional data for a plurality of materials.

8. A graphics system operative to process different cube map textures, comprising:
   a graphics processor configured to determine a texture value within an array of cube map textures stored as an atlas of two-dimensional textures in a graphics memory, said graphics processor utilizing another cube map texture as an index to said array of cube map textures in which index information on said another cube map texture includes a face number and a coordinate offset within each face, an intersection of a three-dimensional input vector with a face of said another cube map texture specifying address information for selecting texture coordinate values from said array of cube map textures, said array of cube map textures storing different instances of directional data.

9. The graphics system of claim 8, wherein said graphics processor determines texture coordinates on said atlas by performing an address cube map fetch to fetch address information and utilizes an address mapping to determine texture coordinates within said atlas.

10. The graphics system of claim 8, wherein said address information specifies one of said six faces and a texture coordinate offset.

11. The graphics system of claim 8, wherein a pixel shader accesses said selected instance of a cube map texture.

12. The graphics system of claim 8, wherein said set of cube map textures is pre-computed to store directional data for a plurality of objects.

13. The graphics system of claim 8, wherein said set of cube map textures is pre-computed to store directional data for a plurality of materials.

14. A method of accessing cube map textures in a graphics system having a graphics processing unit and a memory, comprising:

providing an array of cube map textures, each cube map texture corresponding to a different instance of directional data of a cube map texture;

providing another cube map texture having index information as an index into said array of cube map textures for a graphics processor to access a selected cube map texture based on a three-dimensional directional vector;

receiving an input three-dimensional directional vector;

said graphics processor determining a face number and coordinate offset of said three-dimensional directional vector with respect to said another cube map texture; and said graphics processor utilizing said face number and coordinate offset to identify a texture coordinate value within said array of cube map textures.

* * * * *